(12) United States Patent
Barger et al.

(10) Patent No.: US 8,555,726 B2
(45) Date of Patent: Oct. 15, 2013

(54) ACOUSTIC SENSORS FOR DETECTING SHOOTER LOCATIONS FROM AN AIRCRAFT

(75) Inventors: James Edwin Barger, Winchester, MA (US); Ronald Bruce Coleman, Arlington, MA (US); John N. Stanley, Wilmington, MA (US)

(73) Assignee: Raytheon BBN Technology Corp., Cambridge, MA (US)

(*) Notice: Subject to any disclaimer, the term of this patent is extended or adjusted under 35 U.S.C. 154(b) by 160 days.

(21) Appl. No.: 13/336,584

(22) Filed: Dec. 23, 2011

(65) Prior Publication Data

US 2013/0160556 A1 Jun. 27, 2013

(51) Int. Cl.
*G01H 5/00* (2006.01)
*G01S 3/80* (2006.01)

(52) U.S. Cl.
USPC .............................. 73/645; 367/127

(58) Field of Classification Search
USPC .................... 73/645; 367/127, 906
See application file for complete search history.

(56) References Cited

U.S. PATENT DOCUMENTS

| | | | |
|---|---|---|---|
| 5,781,505 A * | 7/1998 | Rowland | 367/127 |
| 6,847,587 B2 * | 1/2005 | Patterson et al. | 367/127 |
| 7,126,877 B2 * | 10/2006 | Barger et al. | 367/127 |
| 7,359,285 B2 * | 4/2008 | Barger et al. | 367/127 |
| 8,320,217 B1 | 11/2012 | Barger et al. | |
| 2010/0020643 A1 | 1/2010 | Barger et al. | |

* cited by examiner

*Primary Examiner* — J M Saint Surin
(74) *Attorney, Agent, or Firm* — Lando & Anastasi, LLP

(57) ABSTRACT

The systems and methods described herein include an acoustic sensor having piezoelectric material housed in a cartridge and sealed with a solid nonporous stainless steel cover. The systems include additional elements to tune the performance of the acoustic sensor for measuring shockwaves on the surface of an aircraft, such as a helicopter. In particular, the system includes several vibration isolating elements including foam pads and O-rings disposed between the cartridge and the cover for isolating the piezoelectric material from aircraft vibration and turbulence. Additionally, the systems and methods include circuitry for converting analog electrical signals generated by the piezoelectric material, in response to acoustic signals, to digital electrical signals.

25 Claims, 10 Drawing Sheets

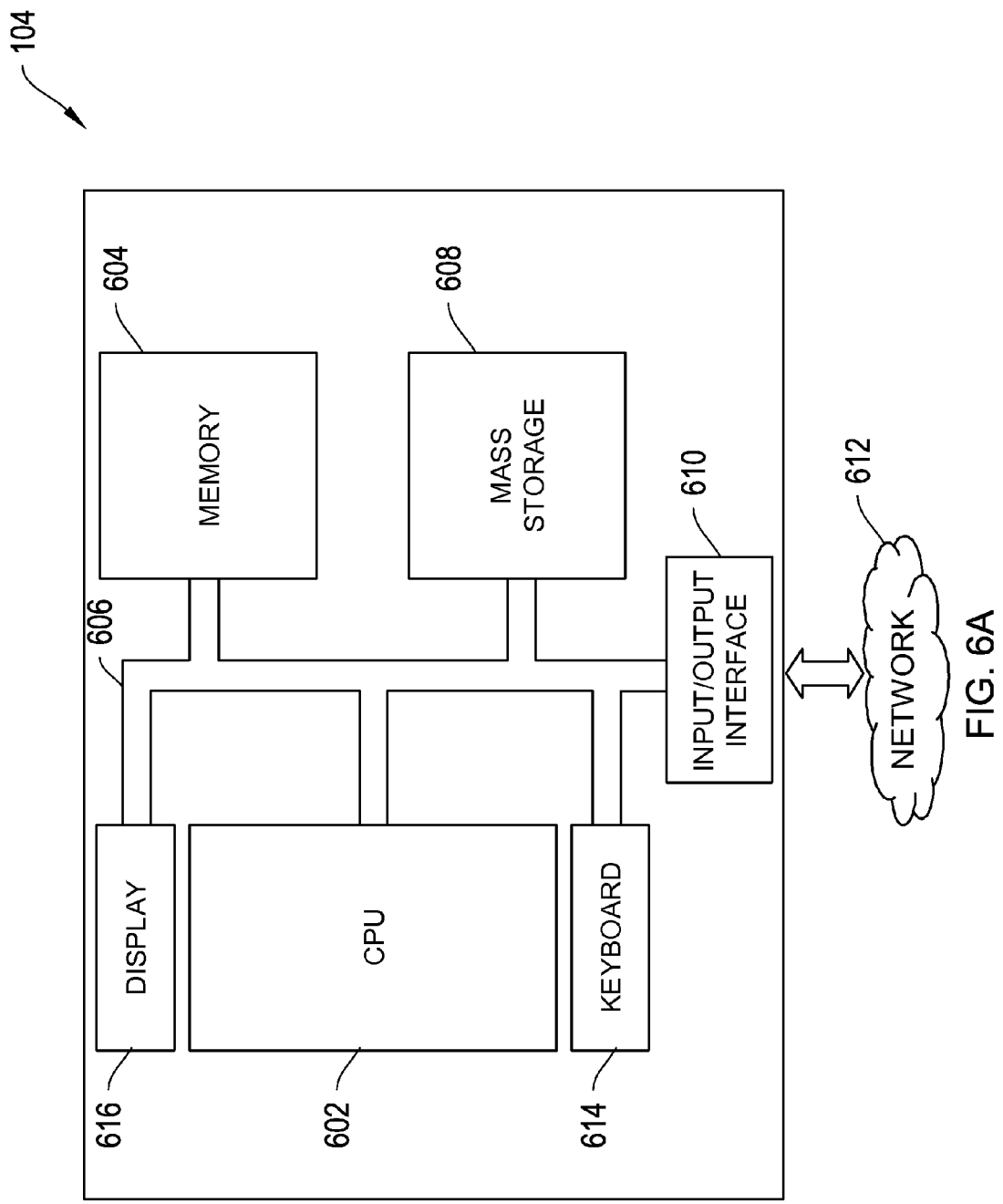

ACOUSTIC SENSORS FOR DETECTING SHOOTER LOCATIONS FROM AN AIRCRAFT

FIELD

The present disclosure generally relates generally to airborne security systems, and more particularly to acoustic sensors for detecting the origin and path of supersonic projectiles fired at aircraft.

BACKGROUND

With recent developments in weapons technology combined with an evolving face of global terrorism, there has been an increase in the threat posed to aircraft in combat, rescue and humanitarian missions. In particular, terrorist militiamen are using inexpensive, portable and readily available weapons such as sniper rifles and shoulder-fired missiles against low flying aircraft such as helicopters, and airplanes during landing and takeoff. Many military aircraft have systems on board to identify approaching surface-to-air or air-to-air missiles and can defend themselves by deploying appropriate countermeasures.

However, sniper rifles pose larger problems to civilian aircraft as well as conventional on-board defense systems on military aircraft. These weapons tend to be lightweight and require little or no training to operate. Moreover, the bullets from these weapons are much smaller than conventional missiles. Consequently, they are difficult to detect using conventional on-board missile defense systems. Additionally, these weapons are difficult to counter because they are portable. There could be any number of armed individuals moving from one place to another firing at overhead aircraft. Therefore, target aircraft would need to not only deploy counter measures, but also identify and neutralize the source of the gunfire.

Many current-day systems for determining the location of a shooter include sensors that record acoustic signals generated by the muzzle blast of the firing weapon or by both muzzle blast as well the shockwave of the projectile. Typically requiring the signals from the muzzle blast, these systems identify the source of the projectile, the fuselage of an aircraft, however, is generally very noisy and, more importantly, noisy at muzzle-blast frequencies. Therefore, these systems are not effective in an aircraft environment, especially on the body of a plane or helicopter.

There are also systems that detect shooter locations using only acoustic signals from the shockwave of the projectile. Such systems typically include an array of closely spaced sensors. These systems are designed for ground applications, where surface gunfire typically comes from sources that are near their targets and missing projectiles fly close to the target. However, when implemented in aircraft these systems have relatively low accuracy because the aircraft are much further away from the source of gunfire and missing projectiles may fly far away from the aircraft. Furthermore, current airborne shooter detection systems have relatively low accuracy because of the influence of aircraft fluids, dust, airborne particulate matter, vibrational disturbances on an aircraft fuselage and other noise sources on the acoustic sensors themselves.

Accordingly, there is a need for a durable airborne shooter detection system capable of locating a position of a shooter.

SUMMARY

The systems and methods described herein include improved systems and methods for detecting, from an aircraft, the source of projectiles such as bullets. As noted earlier, many modern day shooter detection systems that use signals from projectile shockwaves cannot easily be utilized on an aircraft. These detection systems have one or more microelectromechanical systems-based (MEMS-based) acoustic sensors placed relatively close to each other and are mounted together on a compact unitary body. The MEMS-based sensors typically include a porous dust-screen or cover that allows acoustic pressure waves to pass through and provides physical protection and acts as a windscreen to quiet wind noise. These sensors are typically preferred over other types of sensors because they can convert acoustic signals to a stream of digital data in the presence of sensor vibration and wind. However, the sensors are disadvantageous for use on an aircraft because the porous dust-screens tend to clog and deteriorate and thereby cause the underlying sensors to not work properly and accurately.

The systems and methods described herein, overcome at least these deficiencies. The systems and methods include an acoustic sensor having piezoelectric material housed in a cartridge. To protect the piezoelectric material from dust and fluids, the cartridge is sealed with a nonporous stainless steel cover or diaphragm. The systems include additional elements to improve the performance of the acoustic sensor in the presence of vibration and noise on the surface of an aircraft, such as a helicopter. In particular, the system includes several vibration isolating elements including foam pads, rubber rings and O-rings, disposed between the cartridge, the piezoelectric material and the cover for isolating the piezoelectric material from aircraft vibration and turbulence. The dimensions, shape, weight and configuration of at least the cartridge, piezoelectric material, cover, vibration isolating elements and other components are carefully selected and tuned to determine accurately the location of a shooter based on shockwave information. Additionally, the systems and methods include circuitry for converting analog electrical signals generated by the piezoelectric material, in response to acoustic signals, to digital electrical signals. These digital electrical signals are not distorted by interference from aircraft radars and radios, while analog electrical signals are often distorted by such external systems.

More particularly, in certain aspects, the systems and methods described herein include an acoustic sensor for use with an airborne shooter detection system for an aircraft. The acoustic sensor comprises a cartridge having an opening, a sensor assembly disposed within the cartridge, and conversion circuitry. The sensor assembly includes a piezoelectric element, a non-rigid element disposed between the sensor assembly and the cartridge, and a substantially nonporous cover. The piezoelectric element may have one or more layers for generating analog electrical signals indicative of acoustic signals received at the sensor assembly. The substantially nonporous cover may be disposed over and mechanically coupled to the piezoelectric element and extending over the opening of the cartridge such that acoustic signals received on the sensor assembly are transferred to the piezoelectric element. In such aspects, the conversion circuitry is configured for receiving analog electric signals from the piezoelectric element and converting the analog electric signals to digital electrical signals.

In certain embodiments, the acoustic sensor further comprises an outer housing, for at least partially enclosing the cartridge and the sensor assembly, and for coupling the sensor assembly to a fuselage of an aircraft. The outer housing may include an opening and a shoulder extending along the perimeter of the opening. In certain embodiments, the width of the shoulder may be substantially similar to the radius of the cover. The width of shoulder may be substantially similar to a radius of a top surface of the piezoelectric element. The acoustic sensor may further comprise one or more non-rigid elements between the cartridge and the outer housing. The one or more non-rigid elements may include at least one of an O-ring and flat rubber ring. The non-rigid elements may have a stiffness of about 15 kN/m.

In certain embodiments, the piezoelectric element includes lead zirconate titanate (PZT). The piezoelectric element may include soft lead zirconate titanate (PZT) having an electromechanical coupling coefficient larger than 0.6. The piezoelectric element may be sized and shaped to generate an output of about 2 volts for an input of about 0.1 bar. In certain embodiments, the acoustic sensor further comprises a mass disposed below the piezoelectric element. The mass may be bonded to a bottom portion of the piezoelectric element. Generally, the mass may be sized and shaped to provide substantially uniform sound pressure substantially through the one or more layers of the piezoelectric element.

The cover may include a stainless steel cover plate having a thickness of about 2 mils and a diameter of about 1.4 to about 1.5 times a diameter of the piezoelectric element. The cover may be sized and shaped relative to the piezoelectric element such that the axial resonance frequency of the sensor assembly is about 300 Hz. The cover may include a central flat region and a perimeter region having a plurality of folds.

In other aspects, the systems and methods described herein include an airborne shooter detection system for an aircraft. The airborne shooter detection system comprises a plurality of sensors and a processor. The plurality of sensors are spaced apart on the surface of the body of an aircraft configured for receiving acoustic signals indicative of one or more characteristics of a shockwave of a projectile, wherein the plurality of sensors are coupled to the body of the aircraft. At least one of the plurality of sensors include a piezoelectric element for generating analog electrical signals indicative of the acoustic signals, a non-rigid element disposed between the sensor assembly and the cartridge, a substantially nonporous cover, and conversion circuitry for receiving analog electric signals from the piezoelectric element and converting the analog electric signals to digital electrical signals. The cover is disposed over and mechanically coupled to the piezoelectric element and extending over the opening of the cartridge such that acoustic signals are transferred to the piezoelectric element. The processor is in communication with the plurality of sensors and configured for unambiguously determining the location of the source of the projectile based on the digital electrical signals. In certain embodiments, the airborne shooter detection system further comprises a housing enclosing at least one of the plurality of sensors, wherein the housing is attached to the body of the aircraft. The conversion circuitry may be in electrical communication with the piezoelectric element and the processor, and may be configured to generate a digital signal having a frequency from about 2.8 MHz to about 3 MHz.

BRIEF DESCRIPTION OF THE DRAWINGS

The following figures depict certain illustrative embodiments of the present disclosure in which like reference numerals refer to like elements. These depicted embodiments may not be drawn to scale and are to be understood as illustrative of the present disclosure and as not limiting in any way.

FIG. 6A is a block diagram depicting the physical components of a computer system, according to an illustrative embodiment of the invention.

DETAILED DESCRIPTION

Figure 1:
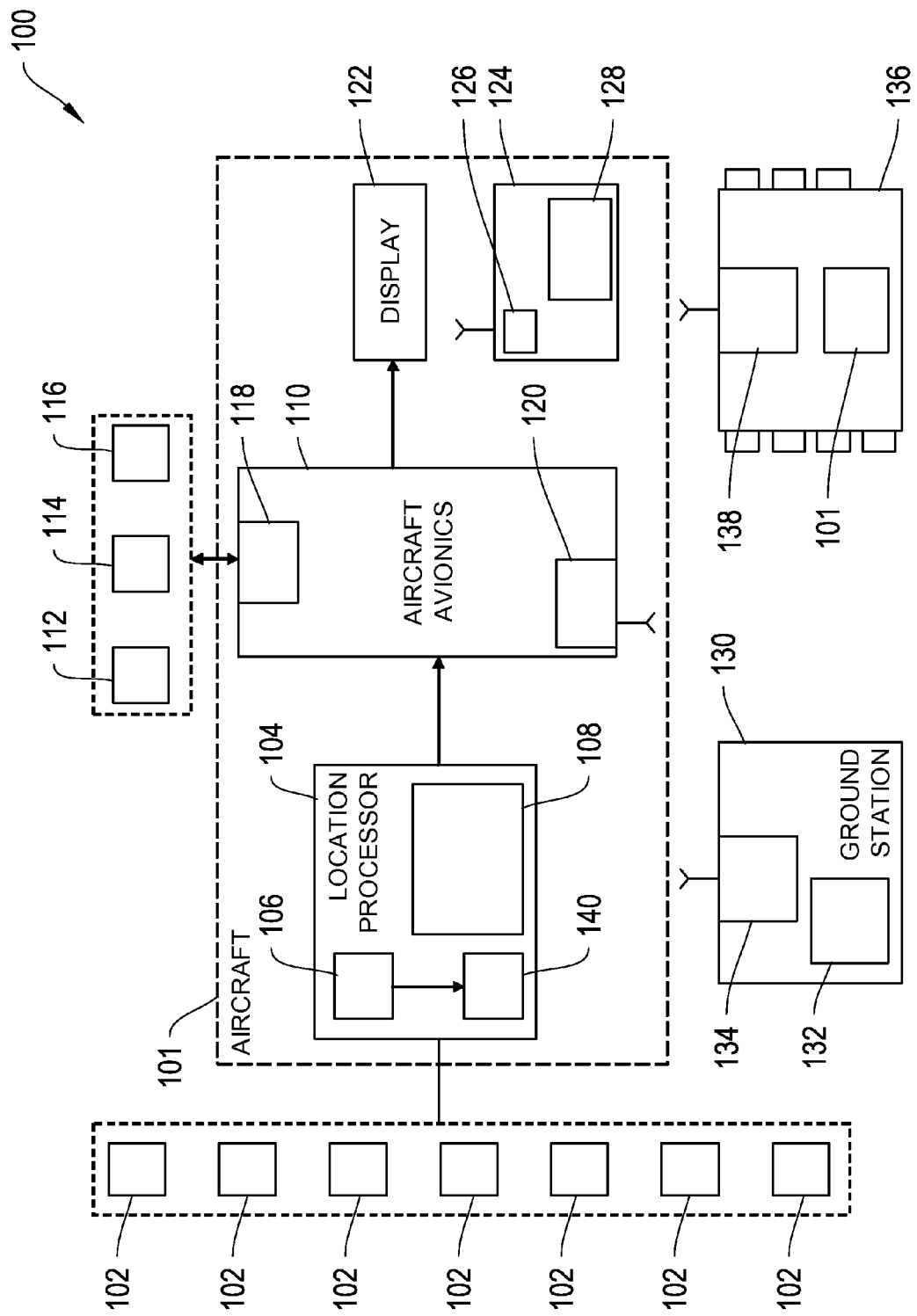
FIG. 1 is a block diagram depicting a detection system on an aircraft for detecting a shooter location, according to an illustrative embodiment of the invention.
Figure 2:
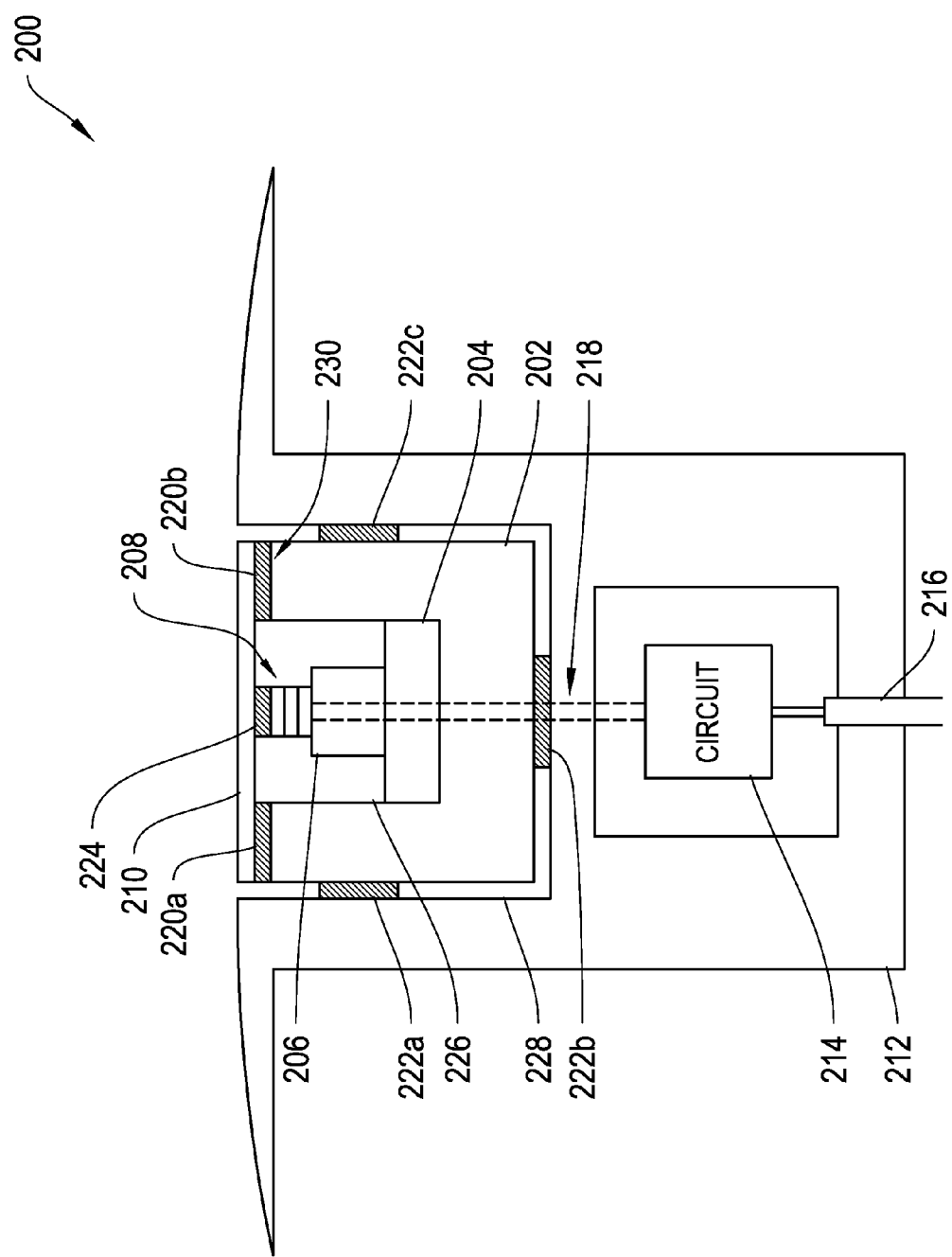
FIG. 2 is a cross-section view of an acoustic sensor, according to an illustrative embodiment of the invention.
Figure 4:
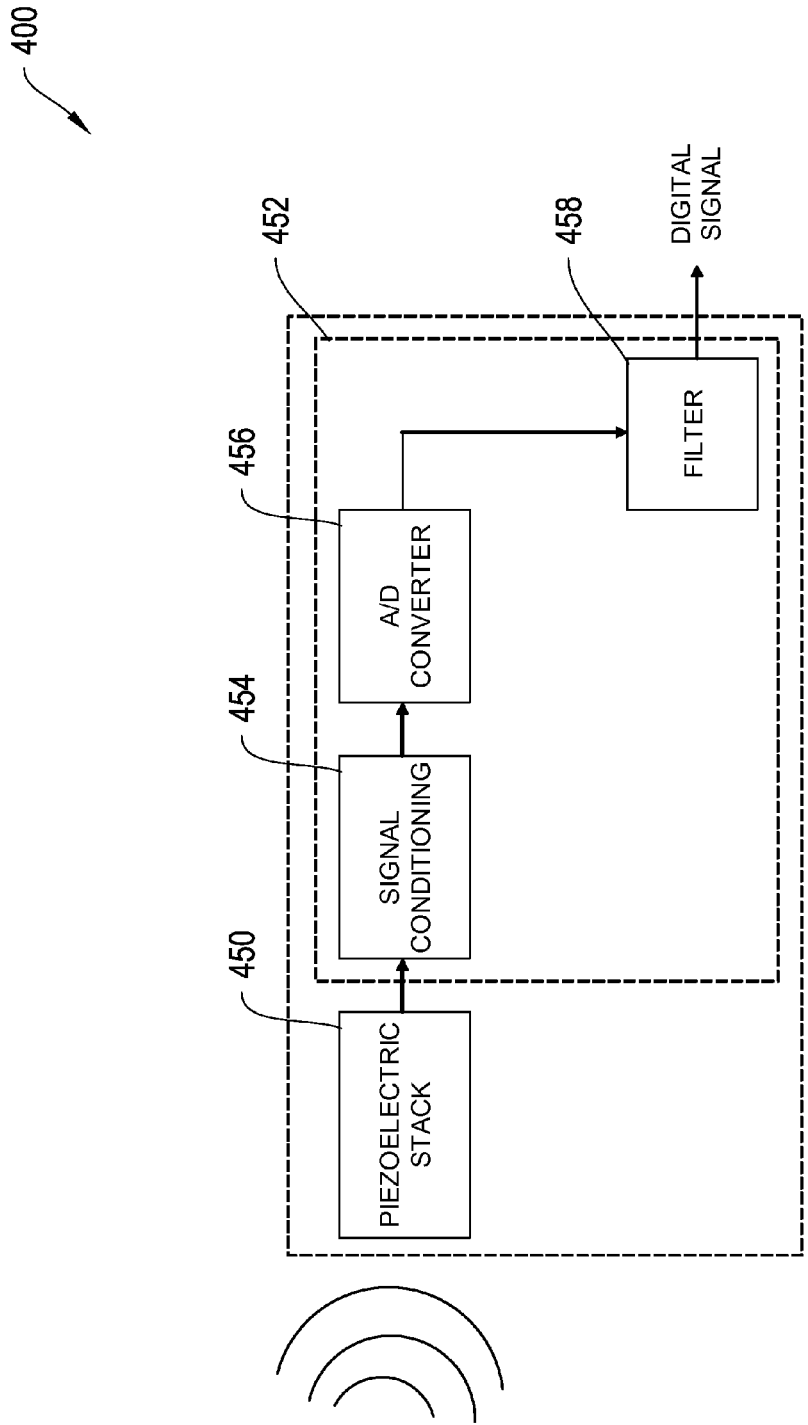
FIG. 4 is a block diagram depicting an acoustic sensor connected to signal processing circuitry, according to an illustrative embodiment of the invention.
Figure 5A:
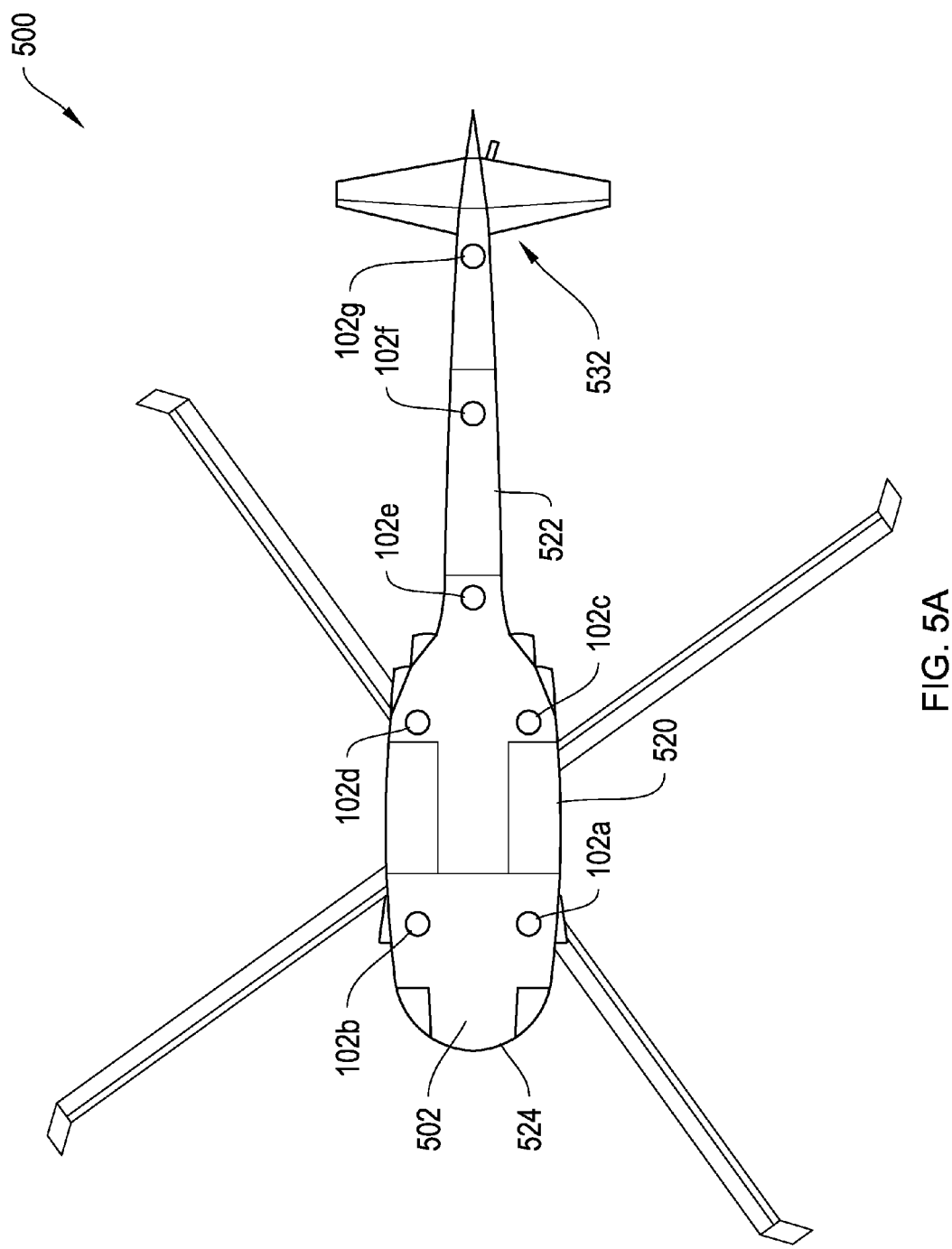
FIGS. 5A and 5B depict bottom and side views, respectively, of a helicopter having a plurality of sensors disposed on the fuselage, according to an illustrative embodiment of the invention.
Figure 5B:
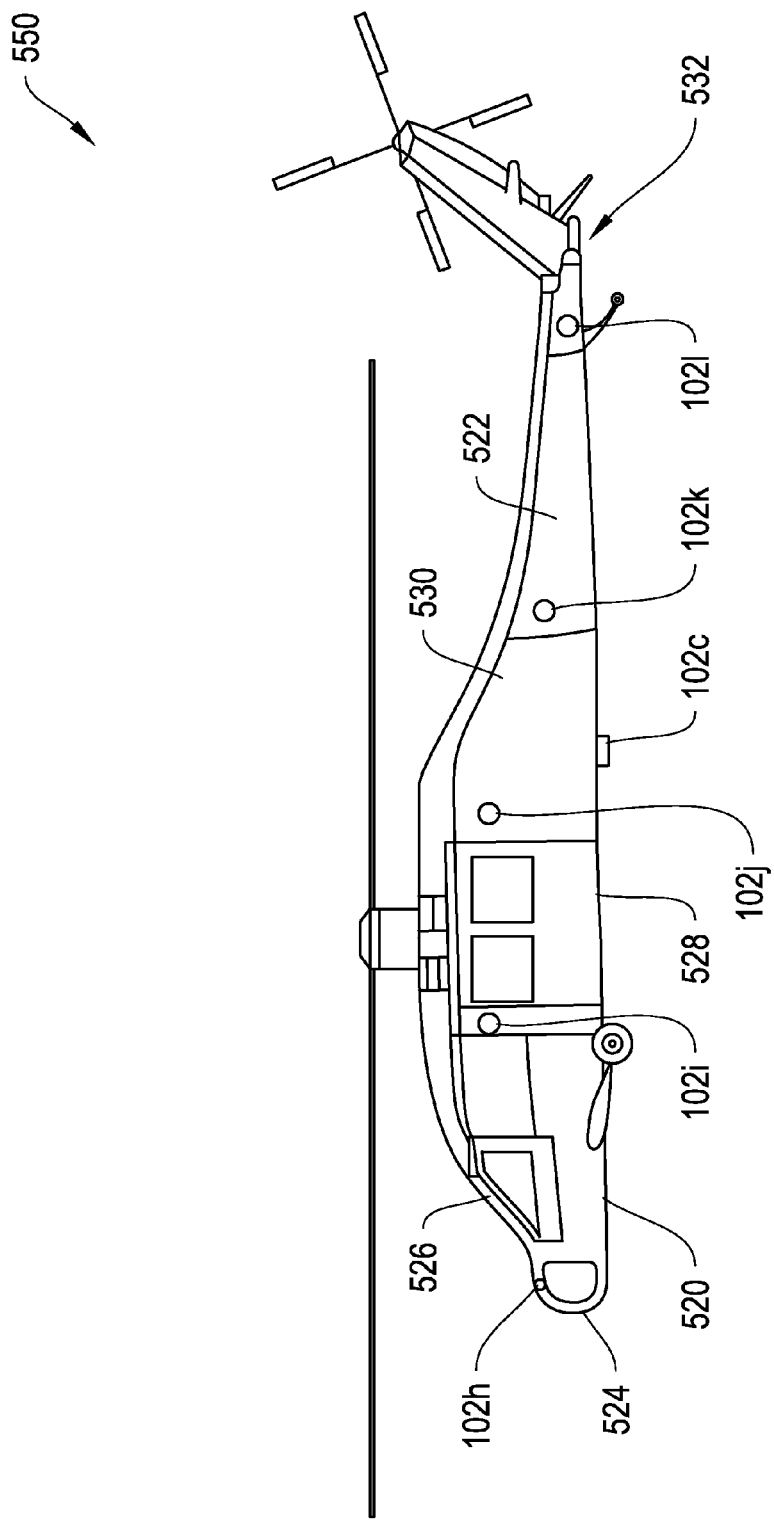
Figure 6B:
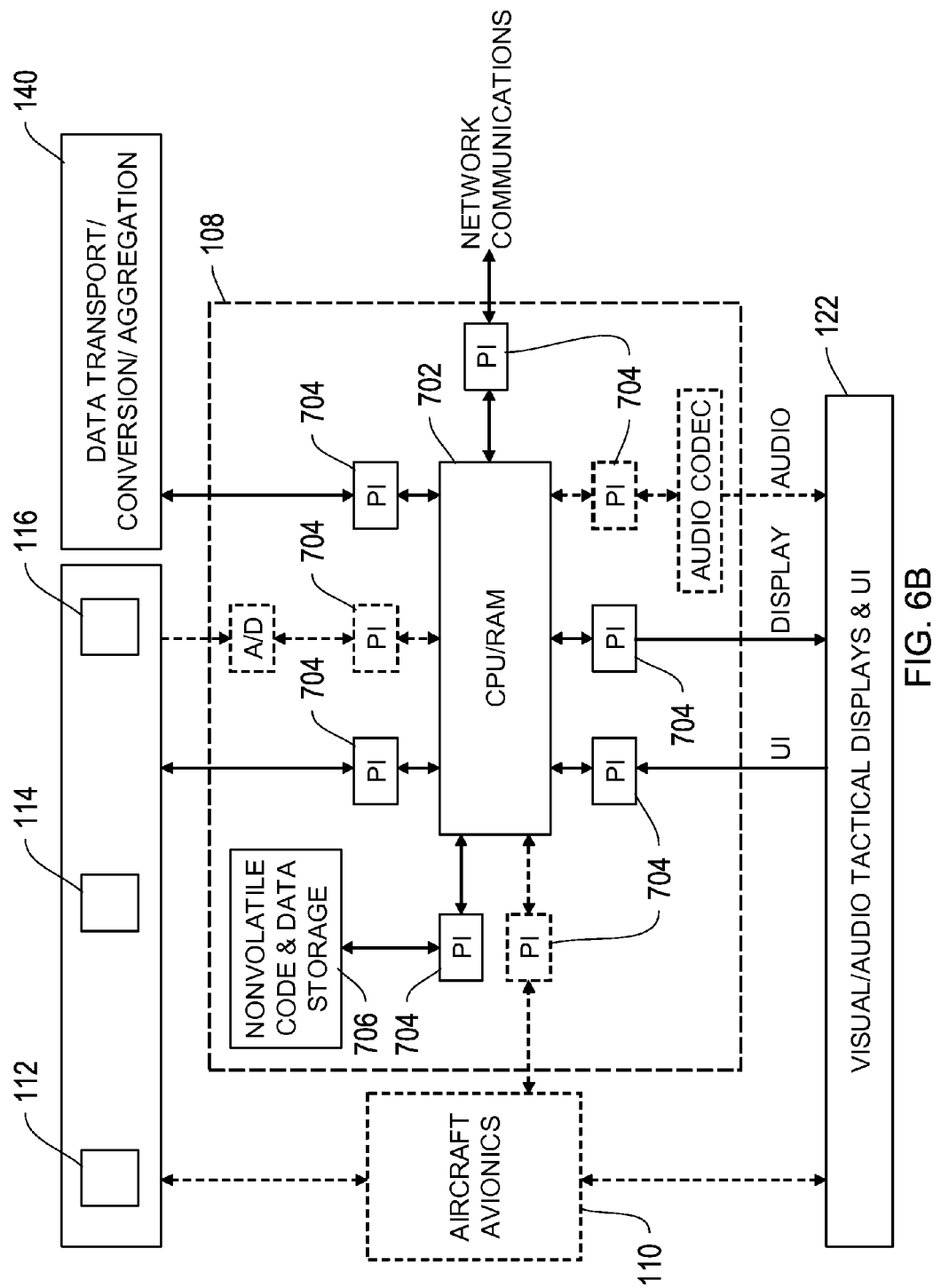
FIG. 6B is a more detailed block diagram depicting the physical components of the computer system of FIG. 6A, according to an illustrative embodiment of the invention.

To provide an overall understanding of the present disclosure, certain illustrative embodiments will now be described, including display apparatus and constituent components thereof. However, it will be understood by one of ordinary skill in the art that the apparatus described herein may be adapted and modified as is appropriate for the application being addressed and that the systems and methods described herein may be employed in other suitable applications, and that such other additions and modifications will not depart from the scope hereof As will be seen from the following description, in one aspect, the systems and methods described herein relate to a detection system having a plurality of sensors coupled to the body of an aircraft such as a helicopter. The sensors include one or more acoustic sensors configured with components and circuitry to convert acoustic signals, such as shockwave and muzzle blast signals, to digital signals. The sensors may be configured and arranged to identify the location of a shooter. FIG. 1 depicts a detection system having seven sensors. FIGS. 2-4 depict a couple of exemplary piezoelectric acoustic sensors to be used with the detection system of FIG. 1. FIGS. 5A-5B depict an implementation of the sensors disposed on the body of a helicopter. Finally, FIGS. 6A-6B depict exemplary computer systems to be used with the detection system.

More particularly, FIG. 1 is a block diagram depicting a detection system 100 for detecting a shooter location, according to an illustrative embodiment. The detection system 100 includes a plurality of acoustic sensors 102 disposed on the body of an aircraft 101. The sensors 102 include several components and signal processing circuitry for receiving and converting acoustic signals to digital electrical signals. The sensors 102 will be described in more detail with reference to FIGS. 2-4. The sensors 102 are connected to a location processor 104 and aircraft avionics 110 that may be located inside the body of the aircraft 101. The location processor 104 includes various functional applications and/or hardware subcomponents for managing the sensors 102 and processing data from the sensors 102. Some functional applications include a sensor calibration and control application 106 for operating the sensors 102 and receiving data from them, and a shooter location application 108 for calculating the location of a shooter. The location processor 104 further includes a data transport/conversion/aggregation component 140 for aggregating the sensor data, converting the data to a suitable format and transmitting the data to the shooter location application 108. The aircraft avionics 110 includes a plurality of electronic circuitry and processors for managing, controlling and operating various features of the aircraft. The aircraft avionics 110 includes, among other things, communication circuitry 120 to communicate with a ground station 130 or with other aircraft 136. The avionics 110 also includes an environmental sensor control unit 118 for operating and collecting data from one or more environmental sensors 112, 114 and 116. In certain embodiments, sensors 112, 114, 116 may be interfaced directly with the location processor 104. The environmental sensors, including temperature sensors 112, aircraft attitude, vector velocity sensors 114 and other sensors 116 such as Mean Sea Level (MSL) and/or Above Ground Level (AGL) altimeters, Global Positioning System (GPS) units and ground velocity sensors are disposed on the external surface of the aircraft fuselage and/or internally.

The avionics 110 is connected to the aircraft's heads-up display 122 for displaying, among other things, relevant shooter location information to the pilot. The avionics 110 may also be remotely connected to the pilot's helmet electronics 124, including a helmet display 128, through the helmet communication circuitry 126. The avionics 110 also communicates with one or more ground stations 130. In certain embodiments, the avionics 110 communicates information about shot detection or shooter location to the pilot via audio/intercom announcements. The avionics 110 may also assist the location processor 104 in determining a shooter location by providing relevant data collected from sensors 112, 114 and 116 and other information obtained from the ground station 130, the ground station detection system 132, another aircraft 136 or from the pilot.

When a projectile such as a bullet, traveling at supersonic speed, approaches the detection system 100, the projectile generates an acoustic shockwave. The shockwave surface is typically an expanding conical surface having its axis coincident with the bullet trajectory. The shockwave surface is also referred to as the Mach cone. To resolve the location of the shooter, the arrival angle, the radius of curvature, and the spatial gradient of the radius of curvature of the expanding conical surface are determined from arrival times measured at five or more sensors 102.

In one embodiment, during operation, the surface of sensors 102, whose airframe coordinates (positions on the fuselage) are accurately known, receive one or more acoustic signals representative of the shockwave generated by a bullet or other projectile. A plurality of sensors receive the shockwave signal at different times and generate electrical signals in response to the shockwave pressure. The shooter location application 108 in the processor 104 determines a Time-Difference-Of-Arrival (TDOA) from the initial portion of the shockwave-only signals. The shooter location application 108 determines the TDOA by designating a sensor that first encounters the shockwave as a reference sensor, and determining the time of arrival of the shockwave at the other sensors in relation to the reference sensor. The shooter location application 108 determines the direction (azimuth and elevation angle) of the origin of the bullet from, among other things, the TDOA information and airframe coordinates of the sensors 102. A more detailed description of the TDOA process for determining shooter location is provided in commonly assigned U.S. Pat. No. 7,126,877, incorporated herein by reference in its entirety. The shooter location application 108 may be created and implemented in the processor 104 using hardware circuitry or using software languages including, but not limited to, C, C++, JAVA. The sensors 102 may also receive one or more acoustic signals representative of the muzzle blast. The system 100 may utilize both shockwave information and muzzle blast information received at the sensors 102, without departing from the scope of the present disclosure.

Generally, sensors 102 include microelectromechanical systems-based (MEMS-based) sensors. These MEMS sensors are advantageous because they can generate digital signals suitable for determining the location of projectiles and their trajectories. To protect internal electronics from aircraft fluids, dust and other particulate matter in the air, MEMS sensors are typically covered with dust-screens. When used repeatedly and for extended periods of time on the fuselage of aircraft, these screens tend to deteriorate. Applicants have identified that it may be desirable, at least in such situations, to replace the porous screen with a nonporous solid cover. However, current MEMS sensors are not configured to interface with a solid plate covering. It may be desirable to instead use acoustic sensors having piezoelectric material responsive to acoustic signals. Advantageously, such sensors may be coupled with a solid plate instead of a porous screen and consequently provide increased durability. FIGS. 2-4 describe such acoustic sensors in more detail.

More particularly, FIG. 2 is a cross-section view of an acoustic sensor 200, according to an illustrative embodiment. Sensor 200 includes a sensor assembly having piezoelectric element 208, a mass 206 and a vibration isolation pad 204 stacked on top of one another and disposed in a cavity/opening 226 in cartridge 202. Sensor 200 includes a nonporous cover 210 disposed on top of the piezoelectric element 208 for protecting the sensor assembly from fluids, dust and particulate matter. The cartridge 202 is disposed within a cavity/opening 228 in housing 212. In certain implementations, the housing 212 may be coupled to an aircraft fuselage. As shown, the top surface of sensor 200 is shaped such that the curvature of the housing 212 and the curvature of the cover 210 conforms to the curvature of the aircraft surface. In such implementations, when disposed on an aircraft, sensor 200 is flush with the outer surface of the aircraft fuselage.

Sensor 200 further includes one or more nonrigid elements such as foam pads, rubber rings and O-rings for vibrationally isolating one component from another. As noted earlier, for airborne applications, it is important to isolate components in the acoustic sensor from aircraft vibration and turbulence. To isolate the housing 212, which is attached to an aircraft fuselage, from the cartridge 202, sensor 200 includes nonrigid elements 222a, 222b and 222c disposed between the outer surface of the cartridge 202 and the inner surface of the housing 212. Sensor 200 also includes nonrigid elements 220a and 220b disposed between the cover 210 and shoulders of cartridge 202 for vibrationally isolating the cover 210 from the cartridge 202. Cover 210 is further attached to piezoelectric element 208 via conductive adhesive 224.

The piezoelectric element 208 typically outputs an analog electric signal. To convert this analog signal to a digital signal, sensor 200 includes an A/D converter circuit 214. Circuit 214 includes one or more additional components for conditioning and/or filtering the signal received from the piezoelectric element 208. Output from the circuit 214 is transmitted through connector 216, which is coupled to the housing 212. In certain embodiments, the circuit 214 may convert the analog signal into DSD (Direct Steam Digital) data using delta-modulation. The DSD signal is typically transmitted as a sequence of single bit values at a sampling rate of 64 times the sampling rates of 44.1 kHz, for a rate of about 2.8224 MHz (which may be 1 bit times 64 times 44.1 kHz) using Low Voltage Differential Signaling (LVDS). In certain embodiments, an LVDS transceiver is used to receive the digital data stream, convert to 16-bit data, digitally filter and downsample to 44 kHz.

To reliably receive shockwave signals and accurately determine shooter locations from an aircraft, the acoustic sensor 200 has to satisfy certain performance criteria. In certain implementations, the performance criteria are designed for military applications and particularly for applications in which one or more sensors 200 are disposed on aircraft, such as helicopters, for detecting shooter locations. In such implementations the acoustic sensor 200 satisfying the performance criteria, has a maximum signal sound pressure of about 0.1 bar, or about 10 kPa. The sensor 200 has a dynamic range of about 90 db, and a bandwidth extending from about 1 kHz to about 25 kHz. The noise response to airflow over the fuselage, in band, is less than about −10 dB/Pa, and the noise response to fuselage vibrations, in band, is less than about −10 dB/Pa. The sensor 200, in such implementations, is hermetically sealed and impervious to aviation fluids and dust. The sensor 200 is configured to be immune to shock and vibration damage to 20 g. As noted above, the sensor 200 includes circuit 214, which in turn may contain integral analog amplifiers and delta modulators clocked synchronously with one or more other sensors used concurrently as shown in FIG. 1. These performance criteria may be modified as needed to suit ground-based applications. Generally, the performance criteria may vary depending on the type of application using the sensor 200.

To satisfy performance criteria for a particular application, the various components of the sensor 200, such as the cartridge 202, piezoelectric material 208, mass 206, cover 210, nonrigid elements and housing 212, are carefully selected, sized, and shaped. Although the performance-based parameters of the sensor 200 will be described below with reference to aircraft application, the sensor 200 may be suitably adapted for any application as desired.

The piezoelectric element 208 includes materials for translating acoustic signals to electrical signals. In particular, the piezoelectric element 208 utilizes the piezoelectric effect to measure pressure, acceleration, strain or force by converting them to electrical charge. The piezoelectric element 208 is sized, shaped and selected such that the maximum signal sound pressure, dynamic range and bandwidth fall within desirable ranges.

In one example, for airborne shooter detection systems the piezoelectric element 208 is selected such that the maximum signal sound pressure of the sensor 200 is about 0.1 bar and the frequency response is at least substantially flat between about 1 kHz and 60 kHz. In such an example, the piezoelectric element 208 includes a stack of lead-zirconate-titanate (PZT) material. The stack is configured in circular, disk-like, shape having a diameter of about 15 mm and total thickness of about 2.7 mm. More generally, the diameter is selected to provide a flow-noise reduction by averaging the small-scale flow pressure fluctuations. The thickness is selected to provide the suitable sensitivity needed for an output of about 2 V, which is typically the maximum voltage allowed for integrated circuit amplifiers, for an input pressure of about 0.1 bar.

To satisfy the above-mentioned performance characteristics, the piezoelectric element 208 is selected for its physical properties. To achieve a maximum signal sound pressure of 0.1 bar and bandwidth of about 1 kHz to about 60 kHz, the piezoelectric element 208 has electromechanical coupling coefficients, $K_p$, of about 0.64, $K_t$ of about 0.45, and $K_{31}$ of about 0.37. The element 208 has a frequency constant of between about 2000 and 2060 Hz.m. The piezoelectric constant, $d_{31}$, of element 208 is about $-210\times10^{-12}$ m/v, and $d_{33}$ is about $500\times10^{-12}$ m/v. Element 208 has an elastic constant, $Y_{33}$, of about $5.4\times10^{-10}$ N/m$^2$, and $Y_{31}$, of about $7.4\times10^{-10}$ N/m$^2$. The piezoelectric element 208 has a mechanical quality factor about 85. In certain embodiments, the dielectric constant and the dissipation factor of element 208 are about 2100 and 2.0, respectively, at 1 kHz. The piezoelectric element 208 has a density of about 7.8 g/cm$^3$. In certain embodiments, the piezoelectric element 208 includes a stack of three layers. In other embodiments, the piezoelectric element 208 may include a stack of greater than three layers. In still other embodiments, the piezoelectric element 208 may include a single layer or a stack of two layers. To cancel common mode vibrations, the piezoelectric element 208 may include a plurality of back-to-back piezoelectric elements.

Generally, piezoelectric element 208 is sensitive to transverse, longitudinal and shear forces. It may be desirable to limit the force response to one or two or three of these forces. To control the force response in one direction, the piezoelectric element 208 is mechanically coupled with a mass 206 and vibration isolation pad 204. In one example, the piezoelectric element 208 is attached to the mass 206 using an adhesive. In certain implementations, mass 206 includes a brass disc or tungsten disc bonded to an inner surface of the piezoelectric element 208. The mass 206 is typically selected to provide a high impedance backing so that sound pressure on the outside of the sensor 200 is substantially uniform throughout the body of the piezoelectric element 208. The mass 206 is also selected to lower the axial frequency of the piezoelectric element 208 to less than, and in some cases much less than, the lowest measured signal frequency. In one example, the mass 206 is shaped as a circular disc having a diameter of about 20 mm and thickness of about 2 mm. The mass 206 has a mass of about 12 g. The mass 206 additionally includes one or more holes to allow wiring to connect the piezoelectric element 208 to signal processing circuitry.

As noted earlier, it is desirable to protect the piezoelectric element 208 from dust, fluids and other particular matter. Accordingly, sensor 200 includes cover 210 disposed on the piezoelectric element 208. The cover 210 is attached to the piezoelectric element 208 via conductive adhesive 224. The cover 210 includes a stainless steel plate having a thickness of about 2 mils and a diameter greater than that of the piezoelectric element 208. In certain embodiments, the diameter of the cover 210 is greater than 1.4 times the diameter of the piezoelectric element 208. As shown in FIG. 2, when the cartridge 202 includes a cavity 226 and a shoulder 230 extending along the perimeter of the cavity 226, the cover 210 extends over the cavity 226 and coupled to the shoulder 230. Generally, the cover 210 may be sized and shaped as desired to secure and protect the piezoelectric element 208 from dust and fluids.

In certain embodiments, it may be desirable to isolate the piezoelectric element 208 and the mass 206 from vibrations on the aircraft. Aircraft vibrations can cause the sensor 200 to resonate at certain frequencies. Therefore, it may be desirable for the axial resonance frequency of the sensor 200, particularly, the cover 210, piezoelectric element 208 and mass 206 to be less than the lowest signal frequency. In certain embodiments, the sensor is configured such that the axial resonance frequency is about 300 Hz or about three times less than the lowest signal frequency. To suitably isolate the element 208 from vibration, the sensor 200 includes a vibration isolation pad 204 and one or more nonrigid elements 222a-c (collectively, "elements 222"), and elements 220a-b (collectively, "elements 220"). To calculate and thereby manipulate the axial resonance frequency of the sensor 200, each of the vibration isolation pad 204 and nonrigid elements 220 and 222, and the cover 210 are carefully selected based on the value of their stiffness measurement.

In certain implementations, the vibration isolation pad 204 includes a disc- or ring-shaped neoprene foam element disposed between the mass 206 and the cartridge 202. The vibration isolation pad 204 has a thickness of about 3.2 mm, a modulus of about 0.3 MPa and a density of about 161 kg/m$^3$. The stiffness of the pad 204 is about 15 kN/m. Generally, the stiffness of the pad 204 is selected such that it is less than the stiffness of the cover 210 so that during operation the pad 204 stiffness does not dominate and prevent the cover 210 from vibrating in the presence of shockwaves.

The sensor 200 further includes several nonrigid elements 220 and 222 for providing vibration isolation to the sensor. In particular, nonrigid elements 220 is disposed on shoulder 230 of cartridge 202 for both coupling and isolating the cartridge 202 and the cover 210. Nonrigid elements 220 may include rubber rings. Nonrigid elements 222 isolate the cartridge 202 from the housing 212. Such isolation is particularly useful because the housing 212 is typically coupled directly to the aircraft fuselage and is subject to significant vibrations. Accordingly, it is desirable to isolate the cartridge 202 from the housing 212. The size, shape and material of nonrigid elements 222 may be selected to provide a suitable level of vibration isolation. In particular, in certain embodiments, it is desirable for the resonance frequency of the cartridge 202 having the sensor assembly to resonate at about 100 Hz. In such embodiments, the nonrigid elements 222 is selected from a group consisting of Buna-N rubber with 50A Durometer, Hard Neoprene Foam, Soft Neoprene Foam, and Extra Soft Neoprene Foam. In certain embodiments, nonrigid elements 222 are configured as a rectangular ring of thickness 1 mm or a thickness of 2 mm. In certain embodiments, it is desirable to drop the resonance frequency to below 100 Hz. In such embodiments, in addition to selecting a suitable nonrigid element 220 and 222, the thickness of the mass 206 may be reduced below 2 mm. In such embodiments, the thickness of the mass 206 is about 1 mm.

Generally, the mass and stiffness of the cartridge 202, housing 212, cover 210, mass 206, vibration isolation foam pad 204 and nonrigid elements 220 and 222 may be modeled as simplified lump parameter model and optimized such that the piezoelectric element 208 resonates at about 300 Hz.

The cartridge 202 having the sensor assembly is disposed within a cavity 228 in housing 212. Housing 212 is configured, sized and shaped to accommodate the cartridge 202 and one or more additional components. For example, the housing 212 encloses circuitry 214 for converting analog signals received from the piezoelectric element 208 to digital signals useful for further signal processing by a location processor 104 or aircraft avionics 110. The circuitry 214 will be described in more detail with reference to FIG. 4. The housing 212 further includes one or more connectors 216 for relaying the digital signals from circuit 214 to a remote processor. Generally, the housing 212 is configured to be disposed on an aircraft fuselage as shown in FIGS. 5A and 5B. In certain embodiments, one or more nonrigid elements may be disposed between the housing 212 and the aircraft fuselage to provide vibration isolation for the sensor.

While the sensor disclosed above is described as including components having specific sizes and made of specific materials and such selection of sizes and materials is important to proper functioning of the sensor, other sensor designs may include alternative materials or components having different dimensions without departing from the scope of the invention.

Figure 3A:
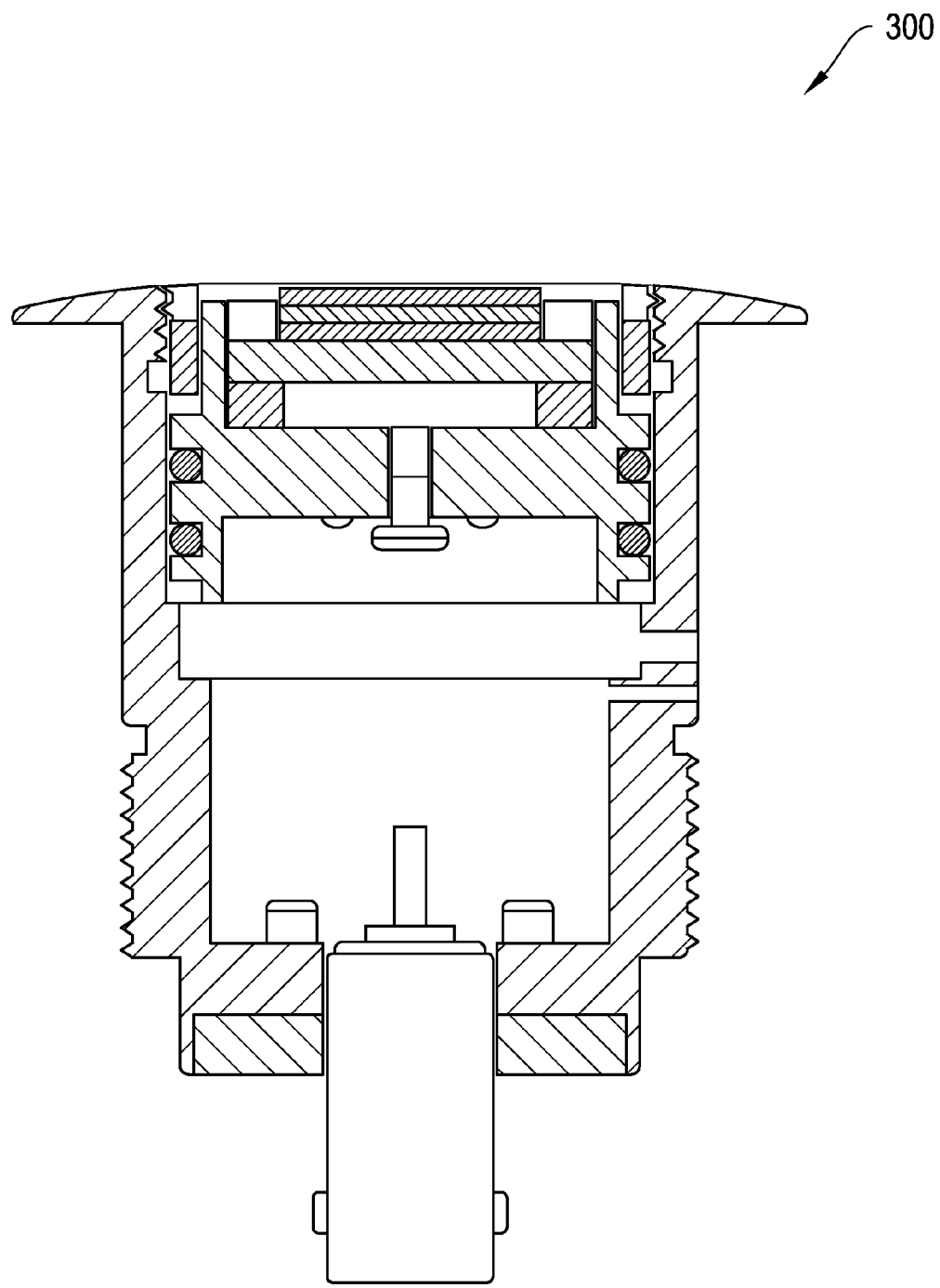
FIG. 3A is a cross-section view of an acoustic sensor, according to an illustrative embodiment of the invention.
Figure 3B:
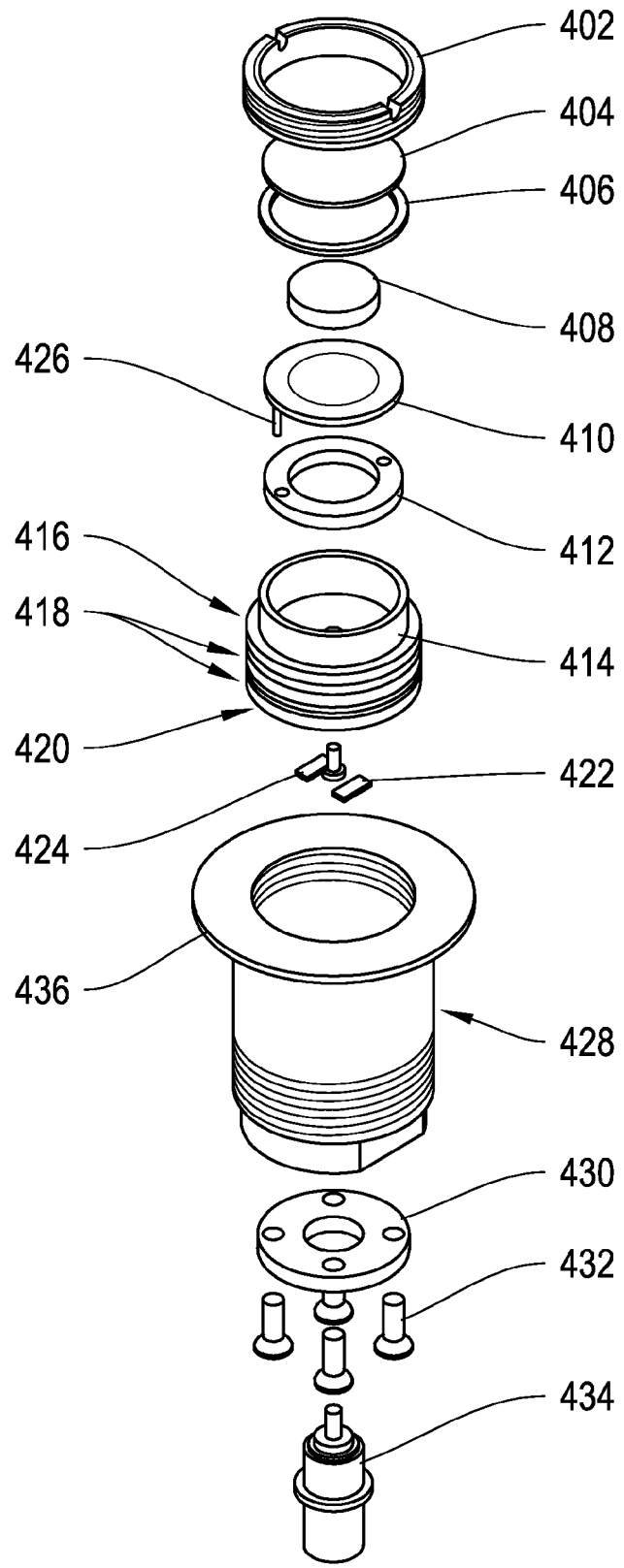
FIG. 3B is an exploded view of the acoustic sensor of FIG. 3A, according to an illustrative embodiment of the invention.
Figure 3C:
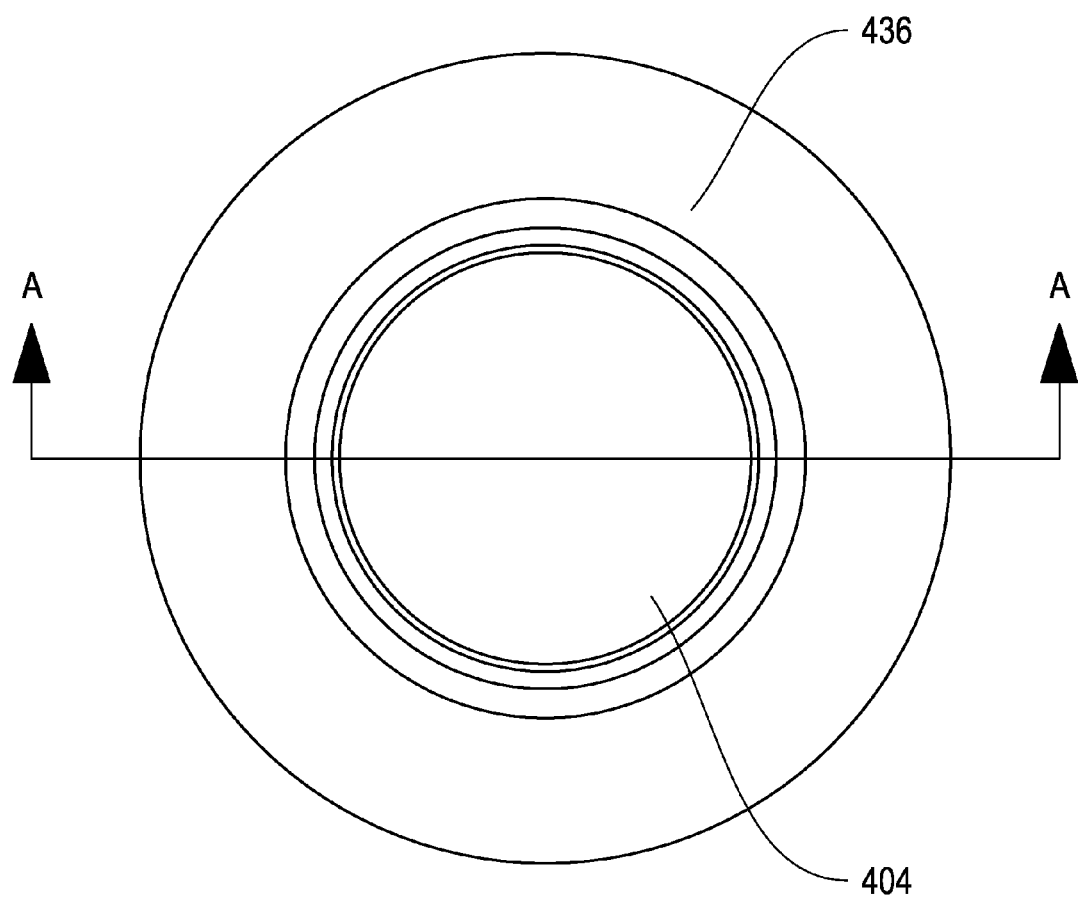
FIG. 3C is a top view of the acoustic sensor of FIG. 3A, according to an illustrative embodiment of the invention.

FIGS. 3A-C depict an acoustic sensor 300 according to another embodiment. The sensor 300 is similar to sensor 200 of FIG. 2, but including additional components, satisfy the performance criteria and general durability requirements. FIG. 3A is a cross-section view of an acoustic sensor 300, FIG. 3B is an exploded view of the acoustic sensor 300, and FIG. 3C is a top view of the acoustic sensor 300. As depicted, sensor 300 includes a sensor assembly having a piezoelectric element 408 (similar to element 208), a mass 410 (similar to element 206), and a vibration isolation pad/ring 412 (similar to element 202). The sensor assembly is disposed within a cartridge 414 (similar to cartridge 202) and sealed within a cover/diaphragm 404 (similar to cover 210). The cover 404 is coupled to the cartridge 414 via rubber ring 406 (similar to nonrigid elements 220). The cartridge 414 further includes a plurality of rubber rings 416 and 420 and one or more O-rings 418 (similar to nonrigid elements 222). The cartridge 414 having the sensor assembly is disposed within a housing 428 and attached via threaded ring 402. Housing 428 includes circuitry for processing the analog signals from the piezoelectric element 408.

Turning to FIG. 3C, the housing 428 includes a shoulder 436, which is shown to extend across a larger diameter than the cover 404. It is desirable for the area of the shoulder 436 to be relatively large to minimize the effect of turbulence when the sensor 300 is disposed on an aircraft. To that end, the cover 404 and the housing 428 are shaped in conformity with the outer surface of the aircraft fuselage such that when disposed on the aircraft, the outer surface of the fuselage is relatively continuous and smooth. Such a shape allows for smooth airflow over the cover 404 and therefore reduced transverse vibrations and turbulence effects. Generally, the area of the shoulder 436 may be selected such that it is large enough to reduce or minimize effects from turbulent boundaries (e.g., boundary between the housing 428 and the fuselage) by keeping the boundary away from the piezoelectric element 408, and small enough to optimize any resonances that may be present in a larger housing 428.

FIG. 4 is a block diagram depicting an acoustic sensor connected to signal processing circuitry, according to an illustrative embodiment. In particular, sensor 450 receives acoustic signals from shockwaves, muzzle blasts and other pressure signals. The piezoelectric stack in sensor 450 converts the acoustic signal to an analog electrical signal. The analog electric signal is sent to the circuit 452, which may be similar to circuit 214 in FIG. 2. Circuit 452 processes the acoustic signal and generates a digital electrical signal. Circuit 452 includes a signal conditioning processor 454, an analog-to-digital converter 456 and a signal filter 458. The signal condition processor 454 includes circuitry to adjust the gain of the analog electrical signal and process the signal to remove any undesirable noise and signal artifacts. The A/D converter 456 converts the amplified and clean analog signal to a digital signal having a frequency of about 2 MHz to about 4 Mhz. In certain embodiments, the A/D converter generates a digital signal having a frequency of about 2.8 MHz. The output from the A/D converter is then filtered by the signal filter 458 which typically also performs some downsampling, as desired.

A sensor (such as sensors 200 and 300) having the circuit 452 disposed within the sensor housing (e.g., housing 212 or housing 428) is a rugged, compact, durable device that is capable of generating a direct stream of digital data having a frequency of about 2.8 MHz in response to acoustic waves having a pressure from about 0.1 bar, over an acoustic bandwidth from about 1 kHz to about 60 kHz, in a noisy and turbulent aircraft fuselage environment. Such sensors may be useful for detecting locations of shooters from an aircraft using shockwave information.

FIGS. 5A and 5B depict bottom 500 and side views 550, respectively, of a helicopter 520 having a plurality of sensors 102 disposed on its fuselage, according to an illustrative embodiment. For purposes of clarity, and not by way of limitation, one exemplary placement of sensors 102 in system 100 may be described herein in the context of placing the sensors 102 on a helicopter. However, it will be appreciated that the principles described herein may be adapted to other aircraft. For example, the principles of this disclosure may be applied to airplanes where the sensors are positioned based on the constraints imposed by the physical structure of the airplane. More generally, the systems described herein may be employed as suitable, and accounting for the constraints present in any aircraft where it is desirable to provide detection system 100.

The bottom portion 500 of the fuselage of the helicopter 520 includes seven (7) sensors 102a-102g positioned from the nose region 524 to the tail region 532. As shown, the region underneath the cockpit 526 includes two (2) sensors 102a and 102b. The regions underneath the cabin 528 and the engine/transmission/fuel tank 530 includes two (2) sensors 102c and 102d. The bottom of tail boom portion 522 includes three (3) sensors 102e, 102f and 102g. In such an arrangement, at least two sensors may be at least 10 m apart. For example, the sensor 102a or 102b under the nose region 524 may be separated from sensor 102g under the tail boom 522 by a distance of greater than about 10 m. One or more physical constraints found on the bottom 500 of the helicopter 520 may influence the placement of the sensors 102a-102g. In certain embodiments, the bottom 500 includes landing gear such as skids or wheel-bays. The sensors 102a-102g may be suitably placed around these physical constraints. In certain embodiments, the sensors 102a-102g may be placed on the skids. In certain embodiments, the sensors 102a-102g may be placed at any location on the bottom 500 as desired. Additional sensors may placed at various locations along the bottom 500.

The top and side portions 550 of the fuselage of the helicopter 520 include a plurality of sensors 102h-102l positioned from the nose region 524 to the tail region 532. Sensor 102h is placed on the nose 524 of the helicopter 520. Sensor 102i is placed between the cockpit 526 and cabin 528 of the helicopter 520. Sensor 102j is placed on the engine/transmission/fuel tank 530 and sensors 102k and 102l are disposed on the tail boom 522. In certain embodiments, sensor 102h may be placed anywhere on the nose 524 including the front portion. In such an arrangement, at least two sensors may be at least 10 m apart. For example, the sensor 102h on the nose region 524 may be separated from sensor 102l on the tail boom 522 by a distance of greater than about 10 m. One or more physical constraints found on the front and sides 550 of the helicopter 520 may influence the placement of the sensors 102h-102l. As an example, the sides of the helicopter 520 may include a plurality of doors, windows and service bays. The sensors 102h-102l may be suitably placed around these physical constraints.

Sensors similar to sensors 102h-102l may be placed on the side opposite to side 550 of the helicopter 520. In one embodiment, the helicopter 520 include a total of sixteen (16) sensors including four (4) on each of the right and left side, two (2) in the front on the nose 524 and seven (6) on the bottom 500.

FIG. 6A is a general block diagram depicting the physical components of a location processor 104, according to an illustrative embodiment. The exemplary location processor 104 includes a central processing unit (CPU) 602, a memory 604, and an interconnect bus 606. The CPU 602 may include a single microprocessor or a plurality of microprocessors for configuring location processor 104 as a multi-processor system. The memory 604 illustratively includes a main memory and a read only memory. The computer 110 also includes the mass storage device 608 having, for example, various disk drives, tape drives, FLASH drives, etc. The main memory 604 also includes dynamic random access memory (DRAM) and high-speed cache memory. In operation, the main memory 604 stores at least portions of instructions and data for execution by the CPU 602.

The mass storage 608 may include one or more magnetic disk or tape drives or optical disk drives, for storing data and instructions for use by the CPU 602. At least one component of the mass storage system 608, preferably in the form of a disk drive or tape drive, stores the database used for processing the signals measured by the sensors 102. The mass storage system 608 may also include one or more drives for various portable media, such as a floppy disk, a compact disc read only memory (CD-ROM), DVD, or an integrated circuit non-volatile memory adapter (i.e. PC-MCIA adapter) to input and output data and code to and from the location processor 104.

The location processor 104 may also include one or more input/output interfaces for communications, shown by way of example, as interface 610 for data communications via the network 612. The data interface 610 may be a modem, a network card, serial port, bus adapter, or any other suitable data communications mechanism for communicating with one or more systems on-board the aircraft or on the ground. To provide the functions of a computer 104 according to FIG. 1, the data interface 610 may provide a relatively high-speed link to a network 612, such as on-board avionics intranet, or ground based networks such as the Internet. The communication link to the network 612 may be, for example, optical, wired, or wireless (e.g., via satellite or cellular network). Alternatively, the location processor 104 may include a mainframe or other type of host computer system capable of communications via the network 612.

The location processor 104 also includes suitable input/output ports or use the interconnect bus 606 for interconnection with avionics 110, a local display 616 and keyboard 614 or the like serving as a local user interface for programming and/or data retrieval purposes. Alternatively, personnel may interact with the processor 104 for controlling and/or programming the system from remote terminal devices via the network 612.

The location processor 104 may run a variety of application programs and stores associated data in a database on mass storage system 608. One or more such applications may enable the receipt and delivery of messages to enable operation as a server, for implementing server functions relating to measuring acoustic signals and locating the position of a shooter by system 100 of FIG. 1.

In certain embodiments, the CPU 602 includes circuitry for an analog-to-digital converter and/or a digital-to-analog converter. In such embodiments, the analog-to-digital converter circuitry converts analog signals received at the sensors to digital signals for further processing by the location processor 104.

The components contained in the location processor 104 are those typically found in aircraft computer systems, flight-deck avionics, combat avionics, general purpose computer systems used as servers, workstations, personal computers, network terminals, and the like. In fact, these components are intended to represent a broad category of such computer components that are well known in the art. Certain aspects of the present disclosure may relate to the software elements, such as the executable code and database for the server functions of the detection system 100.

Generally, the methods described herein may be executed on a conventional data processing platform such as an IBM PC-compatible computer running the Windows operating systems, a SUN workstation running a UNIX operating system or another equivalent personal computer or workstation. Alternatively, the data processing system may comprise a dedicated processing system that includes an embedded programmable data processing unit.

The process described herein may also be realized as a software component operating on a conventional data processing system such as a UNIX workstation. In such an embodiment, the process may be implemented as a computer program written in any of several languages well-known to those of ordinary skill in the art, such as (but not limited to) C, C++, FORTRAN, Java or BASIC. The process may also be executed on commonly available clusters of processors, such as Western Scientific Linux clusters, which are able to allow parallel execution of all or some of the steps in the present process.

The method of the present disclosure may be performed in either hardware, software, or any combination thereof, as those terms are currently known in the art. In particular, the present method may be carried out by software, firmware, or microcode operating on a computer or computers of any type, including preexisting or already-installed avionics processing facilities capable of supporting any or all of the location processor's functions. Additionally, software embodying the present disclosure may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present disclosure is not limited to any particular platform, unless specifically stated otherwise in the present disclosure.

FIG. 6B is a more detailed block diagram depicting the physical components of the computer system of FIG. 6A, according to an illustrative embodiment of the disclosure. In particular, the location processor 104 includes a CPU/RAM unit 702 and a plurality of integrated and/or attached peripheral interfaces ("PI") 704. The PI 704 may serve as a communication link between at least two of data transport unit 140, sensors 112, 114 and 116, data storage 706, displays 122 including helmet display, audio units and network communications. The PI 704 may comprise a suitable interface including at least one of a RS232, RS432, RS422 and RS485 serial ports. The PI 704 may also include at least one of universal serial bus (USB), parallel port, I-squared C bus, I-squared S bus, ARINC 429 bus, MIL-STD-1553 bus, Ethernnet, LVDS. The PI 704 may also be fully custom designed for a particular application.

The present disclosure may be embodied in other specific forms without departing from the spirit or essential characteristics thereof. The forgoing embodiments are therefore to be considered in all respects illustrative, rather than limiting of the present disclosure.

The invention claimed is:

1. An acoustic sensor for use with an airborne shooter detection system for an aircraft, comprising:
 a cartridge, having an opening;
 a sensor assembly, disposed within the cartridge, including
   a piezoelectric element, having one or more layers, for generating analog electrical signals indicative of acoustic signals received at the sensor assembly,
   a non-rigid element, disposed between the sensor assembly and the cartridge, and
   a substantially nonporous cover, disposed over and mechanically coupled to the piezoelectric element and extending over the opening of the cartridge such that acoustic signals received on the sensor assembly are transferred to the piezoelectric element; and
 conversion circuitry configured for receiving analog electric signals from the piezoelectric element and converting the analog electric signals to digital electrical signals.

2. The acoustic sensor of claim 1, further comprising an outer housing, for at least partially enclosing the cartridge and the sensor assembly, and for coupling the sensor assembly to a fuselage of an aircraft.

3. The acoustic sensor of claim 2, wherein the outer housing includes an opening and a shoulder extending along the perimeter of the opening.

4. The acoustic sensor of claim 3, wherein the width of shoulder is substantially similar to a radius of the cover.

5. The acoustic sensor of claim 3, wherein the width of shoulder is substantially similar to a radius of a top surface of the piezoelectric element.

6. The acoustic sensor of claim 2, further comprising one or more non-rigid elements between the cartridge and the outer housing.

7. The acoustic sensor of claim 6, wherein the one or more non-rigid elements include at least one of an O-ring and flat rubber ring.

8. The acoustic sensor of claim 1, wherein the piezoelectric element includes lead zirconate titanate (PZT).

9. The acoustic sensor of claim 8, wherein the piezoelectric element includes soft lead zirconate titanate (PZT) having an electromechanical coupling coefficient larger than 0.6.

10. The acoustic sensor of claim 1, wherein the piezoelectric element is sized and shaped to generate an output of about 2 volts for an input of about 0.1 bar.

11. The acoustic sensor of claim 1, further comprising a mass disposed below the piezoelectric element.

12. The acoustic sensor of claim 11, wherein the non-rigid element includes a vibration isolation pad disposed below the mass.

13. The acoustic sensor of claim 11, wherein the mass is bonded to a bottom portion of the piezoelectric element.

14. The acoustic sensor of claim 11, wherein the mass is sized and shaped to provide substantially uniform sound pressure substantially through the one or more layers of the piezoelectric element.

15. The acoustic sensor of claim 1, wherein the non-rigid element has a stiffness of about 15 kN/m.

16. The acoustic sensor of claim 1, wherein the cover includes a stainless steel cover plate.

17. The acoustic sensor of claim 1, wherein the cartridge includes a shoulder extending along a perimeter of the opening.

18. The acoustic sensor of claim 1, wherein the cover has a thickness of about 2 mils.

19. The acoustic sensor of claim 1, wherein a diameter of the cover is about 1.4 to about 1.5 times a diameter of the piezoelectric element.

20. The acoustic sensor of claim 1, wherein the cover is sized and shaped relative to the piezoelectric element such that the axial resonance frequency of the sensor assembly is about 300 Hz.

21. The acoustic sensor of claim 1, wherein the cover includes central flat region and a perimeter region having a plurality of folds.

22. An airborne shooter detection system for an aircraft, comprising
a plurality of sensors spaced apart on the surface of the body of an aircraft configured for receiving acoustic signals indicative of one or more characteristics of a shockwave of a projectile, wherein the plurality of sensors are coupled to the body of the aircraft, and at least one of the plurality of sensors including:
a piezoelectric element, for generating analog electrical signals indicative of the acoustic signals,
a non-rigid element, disposed between the sensor assembly and the cartridge, and
a substantially nonporous cover, disposed over and mechanically coupled to the piezoelectric element and extending over the opening of the cartridge such that acoustic signals are transferred to the piezoelectric element; and
conversion circuitry for receiving analog electric signals from the piezoelectric element and converting the analog electric signals to digital electrical signals; and
a processor in communication with a plurality of sensors configured for unambiguously determining the location of the source of the projectile based on the digital electrical signals.

23. The system of claim 22, further comprising a housing enclosing at least one of the plurality of sensors, wherein the housing is attached to the body of the aircraft.

24. The system of claim 22, wherein the conversion circuitry is in electrical communication with the piezoelectric element and the processor.

25. The system of claim 22, wherein the conversion circuitry is configured to generate a digital signal having a frequency from about 2.8 MHz to about 3 MHz.

* * * * *